United States Patent [19]

Mikami

[11] Patent Number: 4,478,300

[45] Date of Patent: Oct. 23, 1984

[54] DEVICE FOR PREVENTING STICKING OF WEIGHED MATERIAL

[75] Inventor: Yoshiharu Mikami, Kyoto, Japan

[73] Assignee: Kabushiki Kaisha Ishida Koki Seisakusho, Kyoto, Japan

[21] Appl. No.: 411,622

[22] Filed: Aug. 26, 1982

[30] Foreign Application Priority Data

Sep. 9, 1981 [JP] Japan ............................ 56-134716[U]
Oct. 6, 1981 [JP] Japan ............................ 56-148938[U]

[51] Int. Cl.³ .................. G01G 13/00; G01G 21/00; G01G 23/00
[52] U.S. Cl. ................................ 177/59; 177/128; 193/2 R
[58] Field of Search ................ 177/59, 262, 128; 193/38, 11, 2 R; 209/906, 920, 932; 198/771

[56] References Cited

U.S. PATENT DOCUMENTS 579,583  3/1897  Jermyn .......................... 209/638 X
4,286,702  9/1981  Langen .......................... 193/2 R

OTHER PUBLICATIONS

Hazel, H. K. "Cone Feed Technique" IBM Technical Disclosure Bulletin, vol. 2, No. 1, Jun. 1959, p. 7.

Primary Examiner—E. A. Goldberg
Assistant Examiner—Patrick W. Foster
Attorney, Agent, or Firm—Staas & Halsey

[57] ABSTRACT

A device for preventing sticking of weighed material in an automatic weighing apparatus. The device including a material contacting member which is adapted to reduce the area of contact of the weighed material is detachably secured to the material contacting inner surface of at least one of a trough, hopper and a collecting chute constituting the material path of the automatic weighing apparatus.

10 Claims, 15 Drawing Figures

DEVICE FOR PREVENTING STICKING OF WEIGHED MATERIAL

BACKGROUND OF THE INVENTION

The present invention relates to a device for preventing sticking of weighed material in an automatic weighing apparatus. More particularly, the invention is concerned with a device for preventing comparatively viscous weighed material such as boiled beans, pickles or the like from adhering to the constituents of an automatic weighing apparatus such as trough, hopper, chute and so forth.

Generally, a combined weighing apparatus incorporating a computer, referred to as "computer scale", is used for accurately weighing materials which exhibit large variation or fluctuation of weight, e.g. fruits and vegetables, confectionaries, secondary products, perishables or the like.

In such a combined weighing apparatus, batches of the material to be weighed are put into a plurality of weighing hoppers and weighed in respective hoppers. Then, the apparatus selects a combination of batches which provides a total weight closest to the command weight within a predetermined tolerance. The batches constituting the selected combination are then discharged and the evacuated weighing hoppers are charged with new batches of the material for the next weighing operation. This operation is repeated to achieve the automatic weighing of the material.

Objects such as boiled beans, pickles or the like contains liquids of comparatively high viscosity and, hence, are sticky. When such materials are weighed by a combined computer scale, the materials undesirably stick to the constituents of the weighing apparatus such as trough, pool hopper, weighing hopper and chutes, to cause various inconveniences as explained below.

For instance, a weighing error is caused however accurately the material is weighed in the weighing hoppers, if the weighed material is not completely discharged from the weighing hopper. In order to obviate this problem, recently, it has been proposed to coat the surfaces of the constituents contactable with the material with a parting agent such as Teflon, silicon or the like to permit an easy slip of the material. This countermeasure, however, is still unsatisfactory and cannot ensure the perfect separation of the sticking material.

BRIEF SUMMARY OF THE INVENTION

Accordingly, an object of the invention is to provide a device for preventing sticking of weighed material, capable of smoothly carrying and discharging viscous weighed material such as boiled beans, pickles or the like without fail.

Another object of the invention is to provide a device for preventing sticking of weighed material, capable of diminishing damage to viscous weighed material.

Still another object of the invention is to provide a device which can prevent weighed material from sticking to the trough, pool hopper, weighing hopper, chute and so forth, even when the material is highly sticky.

A device for preventing sticking of weighed material in an automatic weighing apparatus. The device includes a material contacting member which reduces the area of contact of the weighed material and is detachably secured to the material inner surface of at least one of a trough, hopper and a collecting chute constituting the material path of the automatic weighing apparatus.

Other features and advantages of the invention will be apparent from the following description taken in conjunction with the accompanying drawings.

DESCRIPTION OF THE PREFERRED EMBODIMENTS

Figure 1:
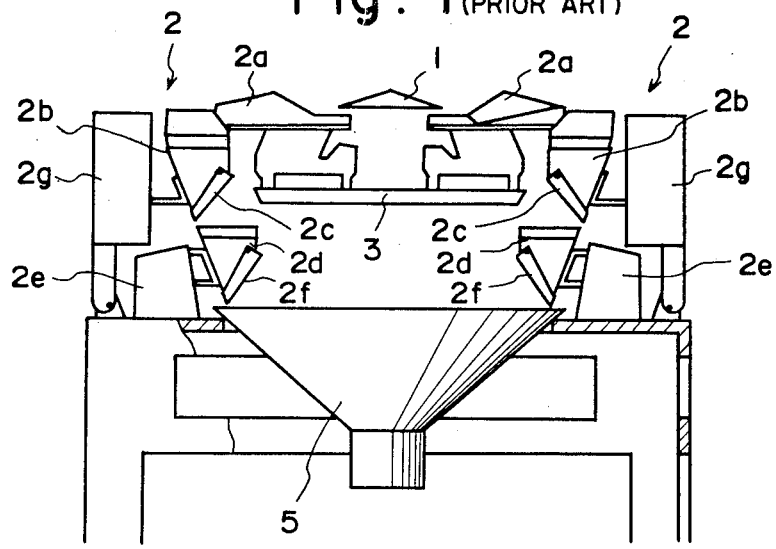
FIG. 1 is schematic illustration of the mechanism of a combined weighing apparatus.
Figure 2:
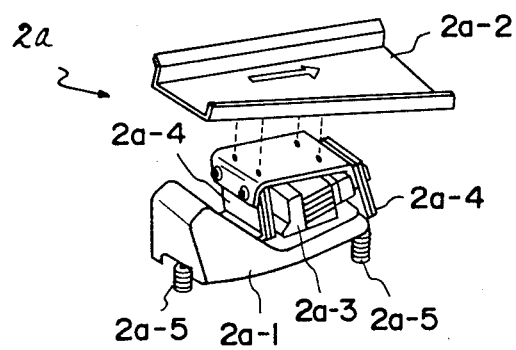
FIG. 2 is a perspective view of a distribution supply device.
Figure 3:
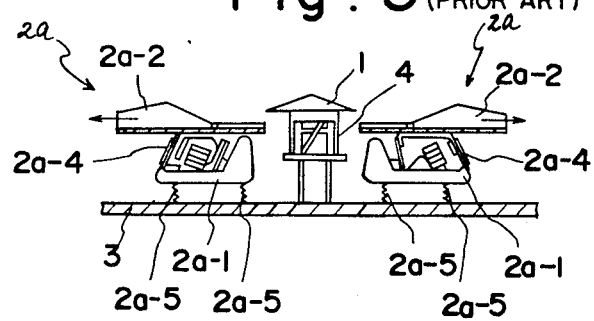
FIG. 3 is an illustration of a distribution table in relation to the distribution supply device.

Referring first to FIG. 1 schematically showing the mechanism of a combined weighing apparatus, a distribution table 1 is adapted to disperse the material to be weighed in the radial direction and to distribute the dispersed batches of material to a plurality of weighing sections 2 arranged radially around the distribution table 1. The distribution table 1 is adapted to be vibrated by a vibrator or the like, so that the dispersed material is distributed to the weighing sections 2 as a result of the vibration of the table for a predetermined time length. In the illustrated embodiments, n weighing sections are arranged, and each section 2 includes a distribution supply device 2a, pool hopper 2b, pool hopper gate 2c, weighing hopper 2d, weight sensor 2e, weighing hopper gate 2f and a hopper driving section 2g. As shown in FIG. 2, the distribution supply device 2a is composed of a feeder base 2a-1 having a predetermined shape, an electromagnet 2a-3, a leaf spring 2a-4 and a trough 2a-2 mounted on the feeder base 2a-1 through the magnet 2a-3 and the leaf spring 2a-4. As will be seen from FIG. 3, a plurality of feeder bases 2a-1 are carried by a circular support member 3 through respective coiled springs 2a-5 and are arranged radially aong the outer periphery of the distribution table 1. In operation, the material to be weighed is put on the distribution table 1 while the latter is vibrated reciprocatingly and spirally by an electromagnetic vibrator 4, so that the material is dispersed radially outwardly along the conical top surface of the distribution table 1 into separate batches which in turn are delivered to respective troughs 2a-9. The batch of material supplied to each trough 2a-2 is conveyed through the latter in the direction of the arrow as a result of a linear reciprocating vibration of the electromagnet 2a-3, and is put into the pool hopper from the end of the trough 2a-2.

Referring back to FIG. 1, each pool hopper 2b is provided with a pool hopper gate 2c. As this pool hopper gate 2c is opened by the operation of the hopper driving device 2g, the batch of material contained by the pool hopper 2b is put into the weighing hopper. Each weighing hopper 2d is provided with a weight sensor 2e for weighing the batch of material put into the weighing hopper 2d. The output from the weight sensors is delivered to a combination controlling section (not shown) which selects the combination of the batches of material which provides a total weight most closely approximating the command weight within a predetermined tolerance. Each weighing hopper 2*d* is provided with a weighing hopper gate 2*f* a. After the selection of the combination, only the weighing hopper gates 2*f* of the weighing hoppers providing the optimum combination are opened to let the batches of material go out of these hoppers. These batches of material are then collected at the lower central portion of the weighing apparatus through a collecting chute 5. The collecting chute 5 has a form resembling a funnel, and the batches of material dropping onto the peripheral portions of the chute are gathered at the central portion thereof naturally by the force of gravity or forcibly by a scraping means (not shown) or the like.

At the initial stage of the weighing operation, the weighing hoppers 2*d* are charged with respective batches of material to be weighed. The weight sensors 2*e* annexed to these weighing hoppers 2*d* weigh the batches of material and deliver weight signals $L_1$ to $L_{10}$ to the combination control section which is not shown. The combination control section then makes a computation of total weights for various hopper combinations and selects a combination which provides a total weight most closely approximating the command weight within a predetermined tolerance. The hopper drive section 2*g* then opens the weighing hopper gates of the weighing hoppers constituting the selected combination. In consequence, the batches of material providing the optimum combination are discharged from these hoppers 2*d* into the collecting chute 5. Then, the pool hopper gates 2*c* are opened to charge the evacuated weighing hoppers with new batches of material. At the same time, the distribution supply devices 2*a* corresponding to the evacuated pool hoppers 2*b* are vibrated for a predetermined time to charge the empty pool hoppers 12*b* with the material to be weighed. Then, the selection of the optimum combination is made in the same manner as that explained before. The weighing operation by the combined weighing apparatus is thus performed repeatedly and continuously.

Figure 4:
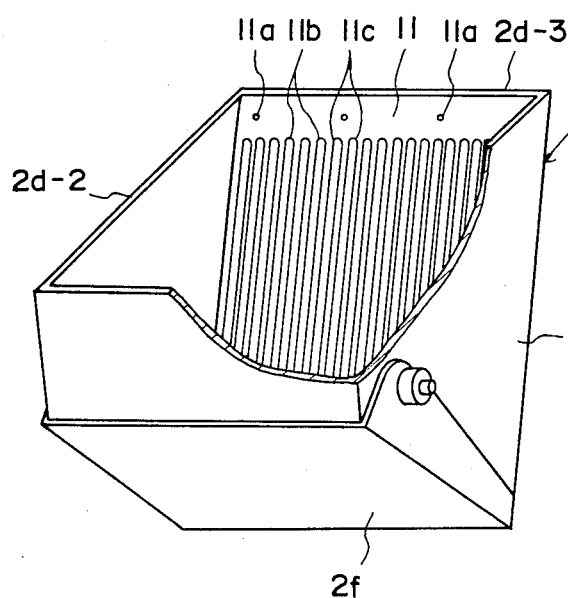
FIGS. 4 to 7 in combination show a device for preventing sticking of weighed material in accordance with an embodiment of the invention.
Figure 5:
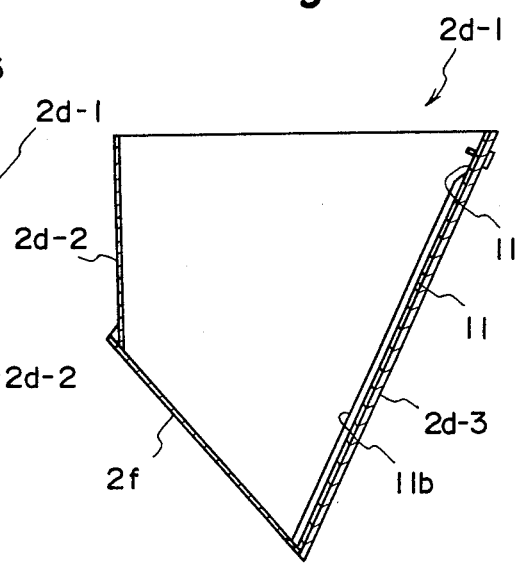

FIGS. 4 and 5 illustrate a device for preventing sticking of weighed material in accordance with an embodiment of the invention, applied to a weighing hopper of a computer scale. Referring to these Figures, the weighing hopper 2*d*-1 has a main body of a substantially inverted triangular cross-section, a pair of frame plates 2*d*-2 and weighing hopper gates 2*f* suitably pivoted to predetermined portions of the opposing frame plates 2*d*-2. A corrugated plate 11 made of a flexible material is detachably spread over the entire surface of the inner surface, i.e. the surface contactable with the weighed material, of a frame 2*d*-3 by means of pins 11*a* or the like means. A multiplicity of ridges 11*b* are formed on the surface of the corrugated plate 11 so as to extend in the longitudinal direction of the latter at a constant pitch.

According to this arrangement, as a viscous material such as boiled beans, pickles or the like is put in the weighing hopper 2*a*-1, the weighed material slides downwardly along the corrugated plate 11. During the sliding, the material contacts only the ridges 11*b* of the corrugated plate 11 but does not contact the entire area of the weighing hopper. This means that the weighed material can slide and drop easily. The water content of the boiled beans, pickles or the like flows downwardly along the grooves 11*c* formed between adjacent ridges 11*b* of the corrugated plate 11. In addition, it is to be noted that the remaining material sticking to the corrugated plate 11, if any, can be separated from the corrugated plate 11 without fail by an impact which is caused by opening and closing of the weighing hopper gate 2*f*. Although the embodiment explained previously is applied to the weighing hopper, this embodiment can equally be applied to the pool hopper.

Figure 6:
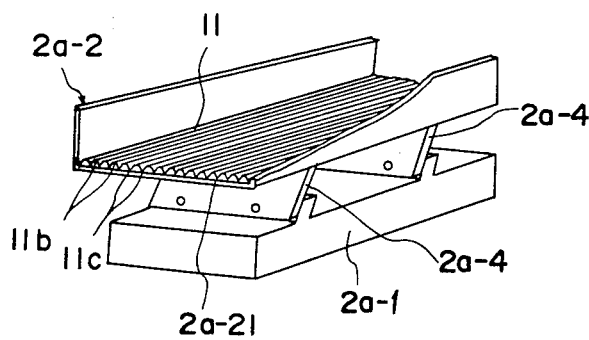

FIG. 6 illustrates a device of the invention for preventing sticking of weighed material applied to a trough 2*a*-2 of a computer scale. The trough 2*a*-2 is supported through a feeder base 2*a*-1 and a leaf spring 2*a*-4. The trough is composed of a thin sheet material bent at both ends. As in the case of the inner surface of the weighing hopper body 2*d*-1 shown in FIG. 4, a corrugated plate 11 is detachably secured to the material contacting surface 2*a*-2*l*, i.e. the surface of the bottom plate. A multiplicity of ridges 11*b* are formed on the surface of the corrugated plate 11 to extend in the longitudinal direction thereof. Grooves 11*c* are formed between adjacent ridges 11*b*.

Figure 7:
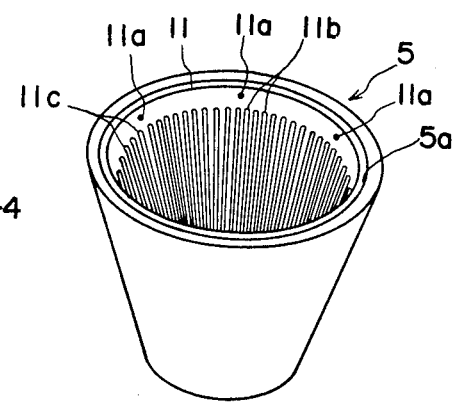

FIG. 7 is an illustration of the sticking prevention device in accordance with the invention applied to the collecting chute 5 of a computer scale. As in the cases of the weighing hopper 2*d* and the trough 2*a*-2, the collecting chute is lined at its material contacting surface, i.e. conical inner surface 5*a*, with a corrugated plate 11 detachably secured thereto by means of pins 11*a* or the like. A plurality of ridges 11*b* are formed on the surface of the corrugated plate 11 to extend in the longitudinal direction thereof. Grooves 11*c* are formed between adjacent ridges. The attaching of the corrugated plate 11 to the collecting chute 5 will be very much facilitated if the corrugated plate 11 is sized and shaped beforehand to fit the inner surface of the collecting chute 5.

FIGS. 8 thru 11 show another embodiment of the invention in which a slippage base plate provided with arcuate projections arranged regularly or iregularly is secured to the desired portion of the material contacting surface of a constituents of the weighing apparatus such as the trough, pool hopper adapted to receive the material to be weighed from the trough, weighing hopper which receives the material from the pool hopper and collecting chute which receives the weighed material from the weighing hopper.

Figure 8:
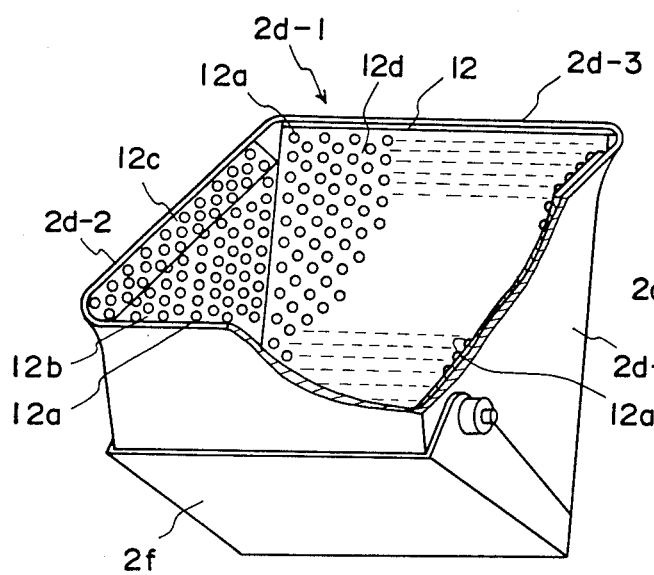
FIGS. 8 to 11 in conbination show another embodiment of the invention.
Figure 9:
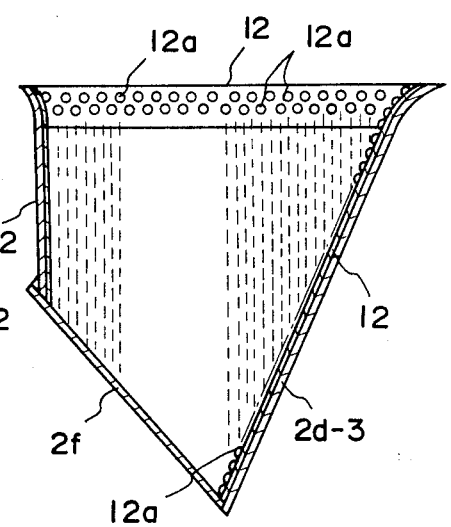

FIGS. 8 and 9 illustrate a sticking prevention device of the invention applied to a weighing hopper of a computer scale. In these Figures, the same reference numerals are used to denote the same parts or members as those shown in FIG. 4. The embodiment shown in FIGS. 8 and 9 is distinguished from the embodiment shown in FIG. 4 in that the entire area of the inner surfaces of the frame plates 2*d*-2, 2*d*-3, i.e. the surfaces contactable with the weighed material, is detachably lined with a slippage plate 12 made of, for example, with a stainless steel and bent in a suitable form. The slippage plate is provided on its surface with a multiplicity of arcuate projections 12*a* arranged regularly or irregularly. The side walls 12*b* of the slippage plate 12 are bent outwardly to constitute retainer tabs 12*c* by means of which the slippage plate 12 is retained by the open brim of the weighing hopper 2*d*.

According to this arrangement, the material to be weighed such as boiled beans, pickles or the like thrown into the weighing hopper 2*d*-1 are made to slip downwardly along the slippage plate 12 lining the inner surface of the weighing hopper 2*d*-1. During the slippage or sliding, weighed material is contacted only by the crests of the arcuate projections 12*a*. Since the contact area is sufficiently small, the weighed material can slide down easily. Meanwhile, the water content exuding from the weighed material such as boiled beans, pickles or the like is made to flow down along the grooves 12d formed between adjacent ridges 12a. Slight deposition of the weighed material sticking to the projections 12a, if any, can be separated without fail by an impact which is produced each time the weighing hopper 2d-1 operates to open and close. Although an embodiment applied to the weighing hopper has been described, this embodiment can equally be applied to the pool hopper of the computer scale.

Figure 10:
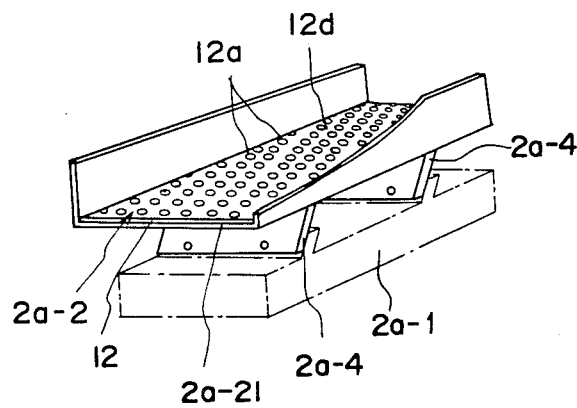

FIG. 10 shows a sticking prevention device of the invention applied to a trough 2a-2 of the computer scale. In this Figure, the same reference numerals are used to denote the same parts or members as those used in FIG. 6. This embodiment is distinguished from the embodiment shown in FIG. 6 in that the material contacting surface, i.e. the surface of the bottom plate 2a–2l of the trough 2a-2 is detachably lined with a tabular slippage plate 12 having a plurality of projections 12a as shown in FIG. 8.

Figure 11:
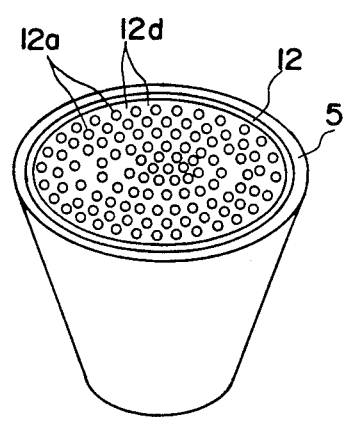

FIG. 11 shows a sticking prevention device of the invention applied to a collection chute 5 of a computer scale. This embodiment differs from the embodiment shown in FIG. 7 in that a slippage plate 12 is detachably secured to the inner surface of the collecting chute 5. The attaching of the slippage plate 12 is made easy provided that the slippage plate 12 is shaped in conformity with the inner surface of the collecting chute 5. If necessary, the open brim of the slippage plate 12 is slightly bent outwardly to form retaining tabs by which the slippage plate 12 is retained by the open brim of the collecting chute 5.

FIGS. 12 thru 15 show still another embodiment of the invention in which a net is detachably secured to the desired portion of the material contacting surfaces of the trough, pool hopper, weighing hopper and the collecting chute.

Figure 12:
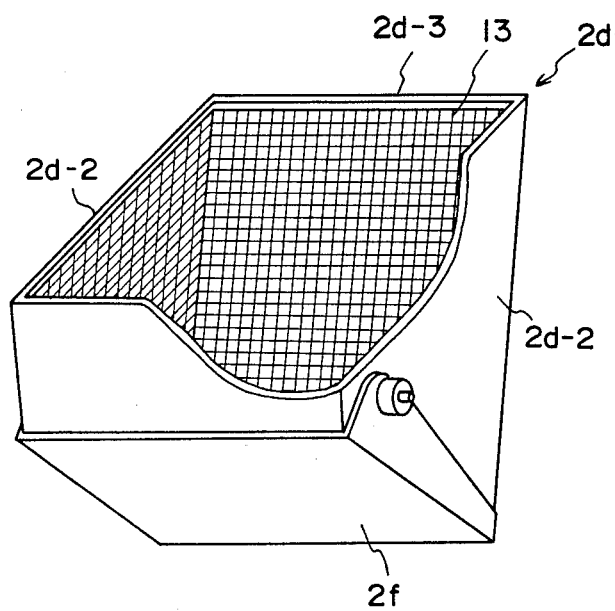
FIGS. 12 to 15 in combination show still another embodiment of the invention.
Figure 13:
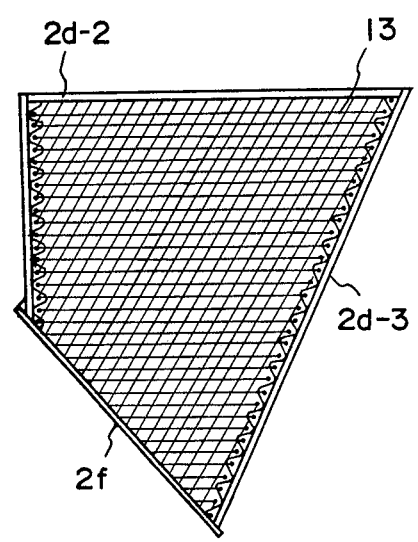

FIGS. 12 and 13 show a sticking prevention device in accordance with the invention applied to the weighing hopper of a computer scale. In these Figures, the same reference numerals are used to denote the same parts or members as those shown in FIG. 4. This embodiment is distinguished from that shown in FIG. 4 by a net 13 such as a metal gauze wire previously formed in conformity with the entire region of the inner surface of the frame 2d-2, 2d-3 is fitted detachably into the weighing hopper 2d-1 from the upper open side thereof to cover the material contacting surface of the frames 2d-1, 2d-3.

According to this arrangement, the material to be weighed such as boiled beans, pickles or the like thrown into the weighing hopper 2d is made to slide down along the net 13 lining the inner surface of the frames 2d-2, 2d-3. The weighed material is contacted only by the net 13 so that the contact area is small enough to permit an easy sliding of the weighed material. Meanwhile the liquid content exuded from the weighed material such as boiled beans, pickles or the like is made to flow down along the metal gauze wire and the inner surface of the frames 2d–2d-3. A slight deposition of the weighed material to the metallic gauze wire 13, if any, can be separated without fail by the impact which is generated each time the weighing hoper body 2d–1 is operated to open and close. Although the described embodiment is applied to the weighing hopper, this embodiment can equally be applied to the pool hopper of the computer scale.

Figure 14:
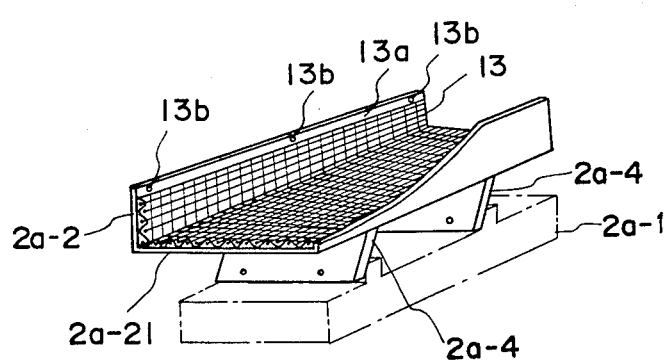

FIG. 14 shows a sticking prevention device in accordance with the invention applied to the trough 2a-2 of a computer scale. In this Figure, the same reference numerals are used to denote the same parts or members as those used in FIG. 6. This embodiment is distinguished from the embodiment shown in FIG. 6 in that a net 13 formed beforehand to cover the entire area of the inner surface of the trough 2a-2 is fitted in the latter through the upper opening of the same 2a-2. The net 13 is detachably secured to the inner surface of the trough 2a-2 at its side edge plates by means of screws 13b.

Figure 15:
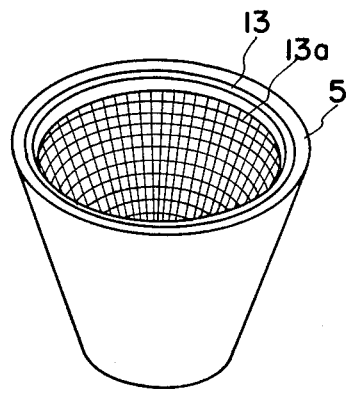

FIG. 15 shows a sticking prevention device of the invention applied to a collecting chute 5 of a computer scale. This embodiment differs from the embodiment shown in FIG. 7 in that a net 13 shaped and sized beforehand to cover the substantially entire area of the inner surface of the collecting chute 5 is fitted in the collecting chute 5 from the upper open end of the latter to detachably line the inner surface of the collecting chute.

The mesh and size of the net 13 is selected taking into account the size and shape of the material to be weighed, i.e. to be somewhat smaller than the size of the material.

As has been described, according to the invention, a corrugated plate 11 made of a flexible material, slippage plate 12 provided with a multiplicity of regularly arranged arcuate projections 12a or a net 13 is detachably secured to cover the required portion of the material contacting surface of the constituents of the computer scale such as trough, pool hopper, weighing hopper and collecting chute. In consequence, the area of the contact of the weighed material with the trough, pool hopper, weighing hopper, collection chute or the like is made sufficiently small so that the undesirable sticking of the material to the material contacting surface is effectively avoided even when the material has a high viscosity as in the case of boiled beans, pickles or the like, and the material can be discharged smoothly without fail. Furthermore, since the corrugated plate, slippage plate or the net is secured detachably, they can be cleaned easily by washing. This is quite advantageous from the view point of sanitation. Furthermore, since the corrugated plate is made of a flexible material, the damaging of the weighed material due to contact with the corrugated plate is diminished advantageously. In the embodiment incorporating the net, it is possible to weigh various granular materials with a single weighing apparatus, by preparing and using a plurality of nets of different meshes and shapes.

What is claimed is:

1. A device for preventing sticking of comparatively viscous weighed material in an automatic weighing apparatus having one or more material transferring sections including a trough, a hopper and a collecting chute, said device comprising material handling means, interposed between the weighed material and an inner surface of at least a portion of one of said material transferring sections, for reducing the area of contact with the weighed material moving thereover and for providing constrained paths for liquid which separates from said weighed material and which paths direct the liquid in the direction of weighed material movement.

2. A device as recited in claim 1, wherein said material handling means is detachably secured to the inner surface.

3. A device as recited in claim 1, wherein said material handling means comprises a flexible material having ridges extending in the direction of movement of the weighed material.

4. A device as recited in claim 3, wherein the ridges are sufficiently close together so that only the liquid passes between said ridges and the weighed material moves along the top of the ridges.

5. A device as recited in claim 1, wherein said material handling means is a plate having a multiplicity of arcuate projections.

6. A device as recited in claim 5, wherein the projections are sufficiently close together so that only the liquid passes between said projections and the weighed material moves along the top of the projections.

7. A device as recited in claim 6, wherein said plate comprises a flexible material.

8. A device as recited in claim 1, wherein said material handling means comprises a net.

9. A device as recited in claim 8, wherein said net has a multiplicity of meshes.

10. A device as recited in claim 9, wherein said net has openings sufficiently small so that only the liquid passes through said net and the weighed material moves over said net.

* * * * *

UNITED STATES PATENT AND TRADEMARK OFFICE
CERTIFICATE OF CORRECTION

PATENT NO. : 4,478,300
DATED : October 23, 1984
INVENTOR(S) : Mikami

It is certified that error appears in the above-identified patent and that said Letters Patent is hereby corrected as shown below:

```
Col. 2, line 17, "conbination" should be --combination--.
Col. 3, line 37, "12b" should be --2b--;
        line 52, ", i.e." should be --, i.e.,--.
Col. 4, line 15, ", i.e." should be --, i.e.,--;
                 after "plate" insert --2a-21--;
        line 37, "iregularly" should be --irregularly--;
        line 52, ", i.e." should be --, i.e.,--;
        line 54, delete "with";
        line 55, delete "a" (first occurrence).
Col. 5, line 50, "2d-1, 2d-3" should be --2d-2, 2d-3--;
        line 61, "2d-2d-3" should be --2d-2, 2d-3--;
        line 64, "hoper" should be --hopper--.
Col. 6, line 43, "view point" should be --viewpoint--.
Col. 8, line 1, after "projections" insert --,--.
```

Signed and Sealed this

Ninth Day of July 1985

[SEAL]

Attest:

DONALD J. QUIGG

Attesting Officer          Acting Commissioner of Patents and Trademarks